United States Patent Office 3,035,228
Patented May 15, 1962

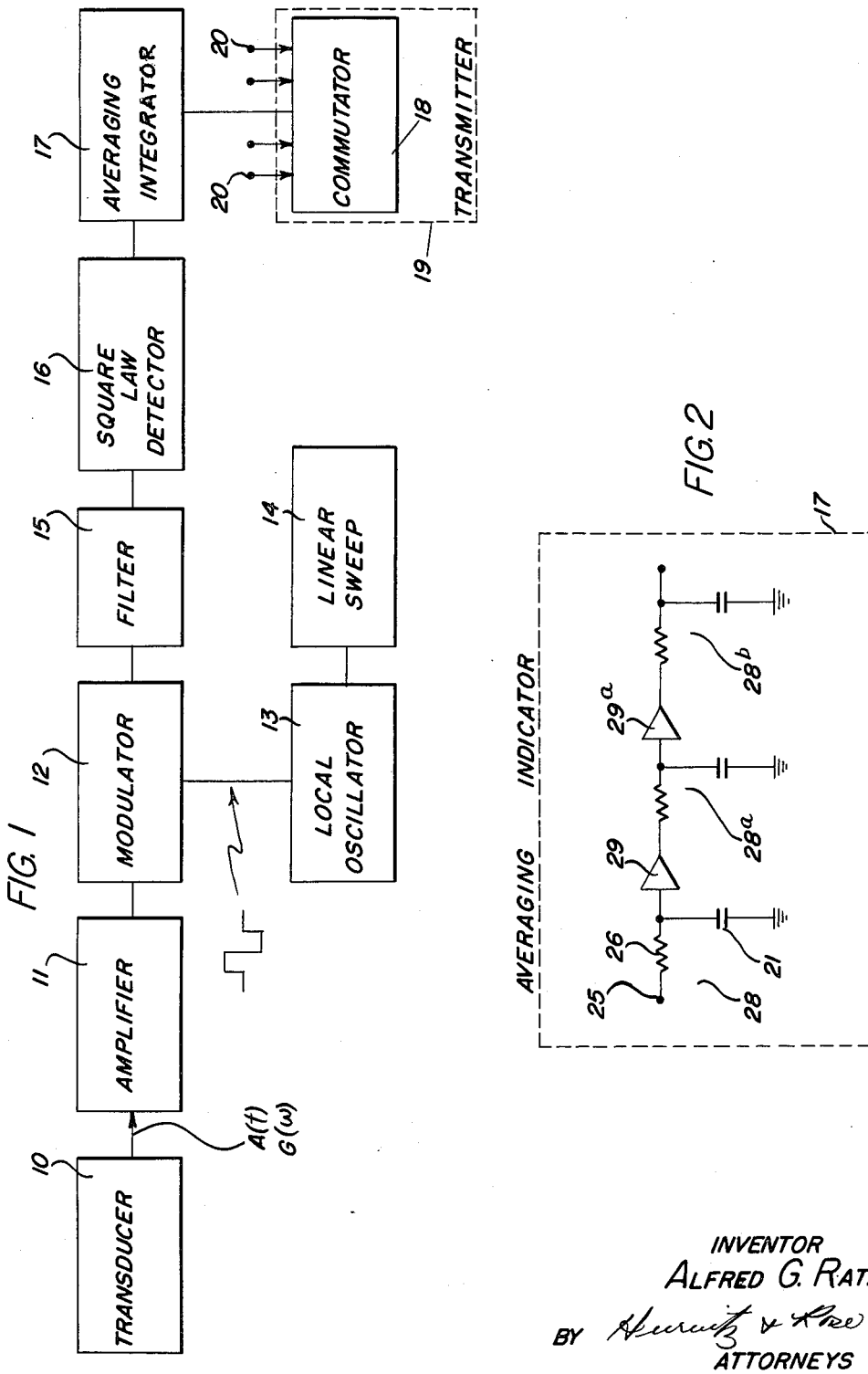

3,035,228
POWER SPECTRUM TELEMETRY
Alfred G. Ratz, Trenton, N.J., assignor, by mesne assignments, to Electro-Mechanical Research, Inc., Sarasota, Fla., a corporation of Connecticut
Filed Oct. 1, 1958, Ser. No. 764,569
11 Claims. (Cl. 324—77)

The present invention relates generally to telemetering and more particularly to statistical telemetering utilizing the transmission via radio link of data pertaining to the spectrum of a signal in place of the signal itself.

Power spectral density is one of the important and useful characteristics of random function data and is useful when frequency characteristics of a signal are desired. The following typical examples illustrate the utility of the power spectral density function:

(1) Measurement of the periodicity of a random function, as in the case of the frequency vibration of a missile member.

(2) Measurement of the resonant frequency or frequencies of a missile component, as in the case of a rate gyroscope.

(3) Measurement of the frequency bandwidth of a signal.

The output of a transducer may be said to be some function of time. If this output is assumed to be a random function, then it may be conveniently stated that this signal is made up of a large number of sine waves of different frequencies and having arbitrary phase relationships. Such a complex signal will occupy a band of frequencies. Divide this band into a number of equal frequency intervals, then measure the power available in each interval. Repeat this measurement, decreasing the width of the interval. Finally then, plot the power available in each frequency interval against frequency as the frequency interval gets vanishingly small. The resulting plot is the power spectral density function.

The basic element of a power spectrum analyzer is a narrow bandpass filter, which divides the frequency bandwidth of the input signal into equal intervals, upon scanning the frequency bandwidth of the signal. The output of the filter is fed into a mean square detector, which reads the average power for a specific period of time, in a narrow band of frequencies about the center frequency of the filter. As the bandwidth of this analyzing filter is decreased indefinitely and averaging time is increased, the measurement yields the power spectral density.

The scanning filter may be one of three types: first, and simplest of the three, a tuned circuit which is moved along the frequency axis by changing the values of its components; second, the most practical type, a heterodyne system in which the frequencies of the original input signal, $A(t)$, are mixed with a tunable local oscillator signal in a frequency converter, fed into a fixed tuned circuit, amplified, detected, and then averaged; and third, an active filter, consisting of an amplifier with a feedback loop containing a tunable circuit highly degenerative at all but a narrow band of frequencies. The first and third types suffer from the disadvantage that mid-band attenuation and bandwidth may vary with the tuning of the filter, with the result that the measured value of the power spectral density will be subjected to errors for which it is not easy to compensate. Consequently, the second type of filter is employed. The heterodyning or modulation of the input signal has the effect of moving the signal spectrum through the analyzing filter at the sweep rate of the spectrum analyzer. The filter analyzes every frequency within the bandwidth for a period of time, $T_f$.

Power spectral density information can be transmitted at a lower frequency than the original function, resulting in a saving of bandwidth. Thus it becomes possible to transmit high-frequency information over a standard low-frequency data channel. It can be shown that the transmission of a complete power spectrum requires a lower sampling rate by a factor of 10 than does transmitting the original function.

The swept-type power spectrum analyzer has the important advantage that the data need not be stationary in time, since this data, although inaccurate under such conditions, can still be used qualitatively. By studying the records of successive sweeps of the analyzer, trends may be observed, making it possible to determine when the data becomes a stationary time series, or when the system under study reaches steady state conditions. This portion of the record can be used for quantitative studies. Only when the data forms a stationary time series does this instrument attain its highest accuracy. The spectrum analyzer lends itself to both qualitative and quantitative studies.

Assume that a random function, $A(t)$, is observed for a period of time T. If $A(t)$ equals zero for all time greater than T, the resulting function may be expressed as a Fourier integral as follows:

$$A(t) = \int_{-\infty}^{\infty} G(f) e^{2\pi i f t} df \tag{1}$$

where $G(f)$ is the frequency spectrum of $A(t)$, but $G(f) = G^*(f)$, because $A(t)$ is a real function. Parzeval's theorem of Fourier integrals gives $$\int_{-\infty}^{\infty} A^2(t) dt = \int_{-\infty}^{\infty} |G(f)|^2 df \tag{2}$$

but $$\int_{-\infty}^{\infty} A^2(t) dt = \int_{-\frac{\pi}{2}}^{\frac{\pi}{2}} A^2(t) dt = \int_{-\infty}^{\infty} |G(f)|^2 df \tag{3}$$

where $|G(f)|^2$ is an even function, i.e., $|G(f)|^2 = |G(-f)|^2$.

Divide Equation 3 by T and allow $T \to \infty$ with the result $$\lim_{T \to \infty} \frac{1}{T} \int_{-\infty}^{\infty} A^2(t) dt = \lim_{T \to \infty} \frac{2}{T} \int_{-\infty}^{\infty} |G(f)|^2 df \tag{4}$$

The first integral is the definition of the average value of $A^2(t)$ which is a measure of the power. Now, let $$\Phi(f) = \lim_{T \to \infty} \frac{2}{T} |G(f)|^2 \tag{5}$$

where $\Phi(f)$ is the power spectral density of $A(t)$, the input signal. This definition is used in generalized harmonic analysis of random functions. If $\Phi_i(f)$ is applied to a filter which has a transfer function equal to $H(f)$, then $\Phi_0(f)$, the output power spectral density, may be written as $$\Phi_0(f) = \Phi_i(f) |H(f)|^2 \tag{6}$$

and $A_f^2(f)$ as $$\overline{A_f^2(f)} = \int_0^\infty \Phi_0(f) df = \int_0^\infty \Phi_i(f) |H(f)|^2 df \tag{7}$$

where $A_f(t)$ is the filter output signal. Equation 7 relates the average value of $A^2(t)$, which is a measure of the filter power output to the input power spectral density, and justifies the use of the mean squared output of a narrow bandpass filter as a measure of the power spectrum of the input signal.

It is, accordingly, a primary object of the present invention to provide a system of telemetering wherein a relatively wide band signal is converted to a further signal representing a power spectrum of the original signal, and wherein the latter is transmitted as a narrow band signal via a radio link, as representative of the wide band signal.

It is another object of the present invention to provide a novel spectrum analyzer capable of being constructed as a small volume unit.

It is still another object of the present invention to provide a system of analyzing the power spectrum of a function having a large noise component, by means of repetitive rapid frequency scans, wherein is provided a novel integrating circuit for effectively smoothing pulses generated during each scan without introducing appreciable distortion of the output pulses.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a power spectrum analyzer in a telemetering system; and FIGURE 2 is a circuit diagram of an averaging integrator utilized in the system of FIGURE 1.

Referring now more particularly to the accompanying drawings, the reference numeral 10 denotes a transducer, assumed to be providing a signal $A(t)$—$G(w)$. A typical transducer might be an accelerometer. The input signal is amplified in an amplifier 11, the output of which is applied to a balanced modulator 12. The latter is also supplied with signal from a scanning local oscillator 13, in the form of a voltage sensitive multivibrator generating square waves. This avoids use of a reactance tube. The frequency of the oscillator 13 is swept through a desired band in response to a sawtooth voltage supplied by a linear sweep source 14.

The output of modulator 12 is supplied to a narrow band filter 15, which selects only one of the side bands generated by the modulator 12, to the exclusion of the original signal and the oscillator frequency. The frequency band selected by filter 15 is supplied to a square law detector 16, at the output of which is supplied an averaging integrator 17. The output of the latter is supplied to the commutator 18 of a telemetering radio transmitter 19.

The modulator 12 may be of the switch type, while a solid state phantastron may be employed to generate the linear sweep. It is then important to assure excellent linearity of sweep to assure that the filter 15 analyzes all frequency intervals for equal times. The switch type modulator, of the solid-state balanced bridge type, operates well in response to the square wave local oscillations provided by oscillator 13. And, moreover, any dissymmetry of the output of the latter offers no difficulty, since it results in the generation of a local oscillator frequency at the output of the modulator 12, and this frequency is not passed by filter 15.

A suitable band for analysis may be 100 to 10,000 c.p.s. In such case, the swept band of the local oscillator 13 may be 20,000 to 30,000 c.p.s.

The accuracy of measurement is determined by the sweep rate, since this fixes the length of time the filter analyzes each frequency interval, so that sweep rate should be determined by the accuracy of measurement required.

The input signal analyzed by one sweep of the power spectral analyzer must be considered to be a sample of the control signal obtained from a measurement. It must be assumed that the sample size is adequate to determine the statistical character of the larger record. It is, therefore, desirable that the process be stationary in time, or that its statistical characteristics be time-invariant.

The filter 15 has a bandwidth and a specific transfer characteristic; these properties permit the filter 15 to perform an additional sampling. The filter also performs a necessary weighted average on the power spectrum, averaging the frequencies at either side of the filter center frequencies. This averaging process introduces two important errors. If $\overline{m}$ neighboring components are averaged, then a statistical error is introduced which approximately equals $$\frac{1}{\sqrt{\overline{m}}}$$

The narrower the filter, the greater the dispersion or statistical error of the output. A blurring error is introduced which increases as $\overline{m}$ is increased. This results from the introduction of a large number of components as the filter bandwidth is increased.

If $\Delta f$ is the filter bandwidth, and the filter is assumed to have a symmetrical transfer characteristic, then the mean square error of the weighted average becomes $$\epsilon^2 = \frac{AK}{I^2} \cdot \frac{2\pi}{\Delta f T} + \frac{1}{4}\beta \frac{J^2}{I^2}(\Delta f) T \qquad (9)$$

where A is a constant determined by the process being measured and $\beta$ is a constant determined by the second derivative of the process. K, I and J are constants which depend on the filter characteristics. The first term is the error due to the statistical nature of the measurement, and the second term is the blurring error. T is the length of the sample in time. The statistical error is inversely proportional to the product of the filter bandwidth and the time of observation.

By minimizing the mean squared error, $\epsilon^2$ in Equation 9, a bandwidth is derived, for which the overall error is a minimum. The result is $$\epsilon^2 = K_\epsilon A^{0.8}\left(\frac{4\pi^2\beta}{T^2}\right)^{0.2}$$

where $$K_\epsilon = \sqrt{\frac{5}{2}} \frac{K^{0.4} J^{0.2}}{I}$$

The constant $K_\epsilon$ is an error coefficient. It is used to determine the minimum error associated with filters of various shapes. This constant has been calculated for various shapes, as follows:

| Filter type | $K_\epsilon$ |
|---|---|
| Single-tuned circuit | $\infty$ |
| Double-tuned circuit (isolated) | 0.77 |
| Triple-tuned circuit (isolated) | 0.71 |
| Tukey's rectangular filter | 0.68 |
| Optimum filter | 0.66 |

It is clear that some latitude exists in the choice of proper filter shape in the above cases. Because of its convenience, the double-tuned isolated circuit is preferred.

The sweep rate has an important effect on the filter characteristics. The frequency component which is set at the filter mid-frequency, is varying at a rate of $q$ c.p.s. because of the time-modulation of the local oscillator 12. It is assumed that the sweep rate is constant.

The effects of the sweep rate on the filter characteristics are as follows:

The peak response is reduced by a factor equal to $$\left[1+\frac{4^3 q^2}{(\Delta f)^2}\right]^{-1/4} \qquad (11)$$

The bandwidth is increased by a factor of $$\left[1+\frac{4^3 q^2}{(\Delta f)^2}\right]^{1/2} \qquad (12)$$

The center frequency is shifted by approximately $$\frac{q}{\Delta f}$$

These effects are minimized by setting $$q \ll 2\pi \frac{(\Delta f)^2}{8} \approx (\Delta f)^2 \qquad (13)$$

The last result restates the fact that the time for a signal to build up in a narrow bandpass filter, as 15, is approximately the reciprocal of the half bandwidth. These results show the interaction between the sweep rate and the filter bandwidth. Since the bandwidth is fixed for any unit, the highest sweep rate which can be used is also fixed.

To provide a numerical example, if $\Delta f$ is set equal to 100 c.p.s., then for the inequality to be valid within about 10%, $q$ must not exceed 1000 c.p.s./s.

It has been stated that a square-law detector 16 must be used. A square-law detector may be defined by the following relation between input voltage, V and output current, I:

$$I = KV^2 \quad (14)$$

where K is a proportionality constant.

Suppose the power spectrum applied to this detector is confined to a relatively narrow band. The total low-frequency output may be expressed as the sum $$I_{dc_t} = I_{dc} + I_{lf} \quad (15)$$

where $I_{dc}$ is the D.C. component and $I_{lf}$ is the variable component. If no filter is used to remove the low-frequency band, then $$I_{lf} = \frac{R^2}{2} \quad (16)$$

where the R is the envelope of V. An interesting result will be obtained if the input signal concerned is assumed to be Gaussian noise. Here $\sigma_1^2$, is the average power in $\Delta f$. The average value, $\overline{V}$, of the input is zero. The output voltage of the square-law detector has an average, $\overline{V}_2$, equal to $2\sigma_1^2$, while the variance is $(2\sigma_1^2)^2$.

Then $$\frac{\sigma}{\overline{V}_2} = \sigma_2 \quad (17)$$

The r.m.s. error is 100%. Therefore, a low-pass filter, or averaging filter, must be used to remove some of the spectrum of fluctuations.

A crystal diode makes a very convenient square-law detector 16. In the case under discussion, the signal level of the filter output will be sufficiently low, as required for best operation of such a crystal. Because of the low level of the detector output and the low impedance requirement, an amplifier and cathode follower may be required before the integrator stage.

The integrator 17 is required to reduce the fluctuations of the filter output. Because the integrator has a finite integrating time, T, and the input function is statistical in nature, the result of such an integration must have an inherent error. A measure of this error is usually defined as $$\frac{\sigma_V}{\overline{V}}$$

where $\sigma_V$ is the standard deviation in the measurement of $\overline{V}$ and V is the mean value. The value of this factor for the case of an RC filter as an averaging device is $$\frac{\sigma_V}{\overline{V}} = \left[ \frac{\frac{1}{\frac{1}{2} + \frac{\omega_f}{\alpha}} + \frac{e^{-2\alpha T}}{1 - \frac{\omega_f}{\alpha}} - \frac{e^{-(\alpha + 2\omega_f)T}}{\frac{1}{2} - \left(\frac{\omega_f}{\alpha}\right)^2}}{1 - e^{-\alpha T}} \right]^{1/2} \quad (18)$$

where T is the sample length, $\omega_f$ is the bandwidth of the input signal, and $\alpha$ is the averaging filter time constant. Two important results follow from this formula:

(1) Wide band case $\omega_f = 10,000$ c.p.s.

(I)   a.   $T \geq \frac{1}{50}$ sec. and $\frac{\sigma_V}{\overline{V}} = 0.1, f_\alpha = 400$ c.p.s.

(II)   b.   $T \geq \frac{1}{5}$ sec. and $\frac{\sigma_V}{\overline{V}} = 0.02, f_\alpha = 210$ c.p.s.

(2) Narrow band case $\omega_f = 1000$ c.p.s.

(III)   a.   $T \geq \frac{1}{5}$ sec. and $\frac{\sigma_V}{\overline{V}} = 0.1, f_\alpha = 400$ c.p.s.

(IV)   b.   $T \geq 2$ sec. and $\frac{\sigma_V}{\overline{V}} = 0.02, f_\alpha = 40$ c.p.s.

A careful study of Equation 18 will reveal that for each value of $$\frac{\omega_f}{\alpha}$$

the valve $$\frac{\sigma_V}{\overline{V}}$$

approaches a limiting value as T increases. Thus, little improvement is realized by increasing T over values cited in cases (I) to (IV). Accuracy of averaging may be traded against the correlation time of the sample.

For the case of an optimum filter $$\frac{\sigma_V}{\overline{V}} = \left[ \frac{2}{1 + \omega_f T} \right]^{1/2} \quad (19)$$

For the case of an ideal integrator $$\frac{\sigma_V}{\overline{V}} = \frac{1}{\omega_f T} [2\omega_f T - 1 + e^{-\omega_f T}]^{1/2} \quad (20)$$

For the case of a low-pass filter in the limit of long observation time and very narrow filter bandwidth, this factor becomes $$\frac{\sigma_V}{\overline{V}} = \frac{1}{\omega_f T} [2\omega_f T - 1 + e^{-\omega_f t}]^{1/2} \quad (21)$$

where $\beta$ is the effective bandwidth. For the ideal integrator $$\beta = \frac{1}{2T}$$

and for an RC filter $$\beta = \frac{\alpha}{4}$$

Thus for an RC filter $$\frac{\sigma_V}{\overline{V}} = \left[ \frac{\alpha}{\omega_f T} \right]^{1/2} \quad (22)$$

Assume a bandwidth, $\omega_f = 10,000$ c.p.s. and $\alpha = T = 1$ second, then $$\frac{\sigma_V}{\overline{V}} = 10^{-2} \text{ or } 1\%$$

When $\omega = 1,000$ c.p.s., then $$\frac{\sigma_V}{\overline{V}} \text{ equals } \sqrt{10} \times 10^{-2} \text{ or } 3\%$$

In the case when $\omega_f = 100$ c.p.s., $\alpha = 100$ rad./sec., and $T = \frac{1}{30}$ sec., then $$\frac{\sigma_V}{\overline{V}} = .055 \text{ or } 5.5\%$$

These figures represent a tremendous reduction of $$\frac{\sigma_V}{\overline{V}}$$

from the value of 100% cited in the Narrow-Band Filter discussion. 100 c.p.s. may be the bandwidth of the filter in the Power Spectrum Analyzer for a wide band case, while 10 c.p.s. may be the filter bandwidth in a narrow band case.

The fact that the power spectrum density of a random function requires a narrow bandwidth for transmission in contrast to the wide band required by the original data has been discussed hereinabove. The low-frequency characteristic of this data lends itself to commutation. Thereby several power spectral density functions may be transmitted as typical low-frequency data sources, as indicated by the arrows 20 at commutator 18.

Assume the time of one complete sweep of the power spectrum analyzer to be R seconds. Let the commutation rate equal M samples per second. A record of the power spectrum analyzer output will consist of RM discrete equally spaced points for each sweep of the analyzer. Also, the commutator has N contacts. The number of discrete points obtainable per sweep will range from RM to NRM. The accuracy desired will determine the number of points to be obtained in a measurement. If the data is changing very slowly, RM points will be sufficient; when the data moves rapidly, more points are required. This is accomplished by using several equally spaced contacts on the commutator.

As an example, let R equal 1 sweep per second. Assume the sampling rate is set at 30 per second. The curve resulting from one power spectrum analyzer sweep will consist of 30 points for the case of poorest accuracy. If the commutator has 30 contacts, then 900 points per sweep is possible. The averaging time is made equal to $\frac{1}{30}$ second for each contact output.

It is important that the time allowed for one sample, $$T_s = \frac{1}{M}$$

is greater than the "ringing" time of the analyzing filter, $$T_f \approx \frac{1}{\Delta f}$$

i.e., $$T_s > T_f \qquad (23)$$

When the data changes slowly and is stationary in time, then several transducers may share one power spectrum analyzer by commutating the various transducer output signals. The data sample being analyzed in the filter must be of sufficient length that its statistical properties are substantially the same as a sample of infinite length.

Assume the required sample length is $T_s$ seconds. If frequency multiplexing is used, as in the case of FM/FM telemetering, then $T_s$ sets the bandwidth requirement of the subcarrier channel. If $\beta$ is the bandwidth required, then $$\beta \approx \frac{1}{T_s} \qquad (24)$$

When $T_s = \frac{1}{10}$ second, then $\beta$ is 10 cycles per second. For time-multiplexing, the sampling rate M becomes $$M \leq \frac{1}{T_s} \qquad (25)$$

For the case $T_s = \frac{1}{10}$ second, $M \leq 10$ samples per second.

The overall error of the power spectrum analyzer herein described may be 10% or less. The error is defined as $$\frac{\sigma_V}{\overline{V}}$$

for each discrete point of power spectrum density. Recalling from Equation 22 that $$\frac{\sigma_V}{\overline{V}} = K\left[\frac{1}{\omega_f T}\right]^{1/2} \qquad (26)$$

then time and bandwidth may be interchanged consistent with accuracy requirements, as previously discussed. For a given accuracy or allowable error $$\left(\frac{\sigma_V}{\overline{V}}\right)$$

doubling T, the sampling or averaging time, divides the allowable bandwidth of the sample by two. Whenever any measurement is planned, the interplay between T and $\omega_f$ must be considered for a given $$\frac{\sigma_V}{\overline{V}}$$

In most telemetry applications the time of sweep is required to be relatively short, of the order of a second or two, which in turn imposes a limitation on the filter 15, i.e., it must be relatively wide. Such being the case, if the function A(t) contains much random or noise like material, the integrating filter 17 is required to smooth the latter. The design of the integrator 17 is, then, one of considerable difficulty. If, for example, an ordinary integrator is employed its response will lag the applied input pulse, and since the timing of successive pulses generated by the scanning process is important, as well as the relative amplitudes of the pulses, this is unacceptable.

In accordance with the present invention, a novel averaging integrator has been provided which is effective to smooth pulses while retaining pulse shape.

Essentially, the integrator comprises a series of cascaded low pass RC filters, separated by amplifiers. The total delay time of the system is then made of acceptable value, but the smoothing accomplished is found to be far greater than is accomplished by a single RC integrator having the same delay time.

Referring more particularly to FIGURE 2 of the accompanying drawings, illustrating a particular form of integrator 17, there is provided an input terminal 25, followed by a series resistance 26 and shunt condenser 21, constituting a low pass filter or integrator 28. The latter supplies signal to an amplifier 29, assumed per se to introduce gain but no delay. The latter feeds into a further low pass filter 28a, which in turn feeds a further amplifier 29a, and the latter in turn a further integrator or low pass filter 28b. The total delay time introduced by the RC networks is selected to be acceptable. It is then found that smoothing is performed far more effectively than would have been the case had a single integrator been employed. The amplifiers 29, 29a are employed to increase signal levels between integrators, since the latter are highly attenuating.

While I have described and illustrated one specific embodiment of my invention, it will be clear that variations o fthe general arrangement and of the details of construction which are specifically illustrated and described may be resorted to without departing from the true spirit and scope of the invention as defined in the appended claims.

What I claim is:

1. In a system for transmitting power spectrum information of a source of signal to be analyzed a solid state switching modulator, a voltage sensitive square wave multivibrator coupled to said modulator, the source of signal to be analyzed connected to said modulator for heterodyning with said square wave, a solid state sawtooth voltage generator coupled to said multi-vibrator, whereby the frequency of said square wave varies directly as a function of the amplitude of said sawtooth voltage, a narrow band filter connected to said modulator and having a pass band arranged to select one heterodyne product of said modulator to the exclusion of frequency components of said square wave and of said signal, a square wave detector responsive to the output of said filter for deriving a signal commensurate in amplitude with the power of said source, an integrator responsive to the output of said detector, said integrator introducing a predetermined error factor $\epsilon$, less than 0.1, in the amplitude of its output relative to its input, said integrator having a bandwidth, $\beta$ related to $\epsilon$, $\omega_f$, the pass band of said filter, in radians per second, and T, the duration in seconds of one half cycle of the highest frequency selected heterodyne product, in accordance with $$\epsilon = 2\left[\frac{\beta}{\omega_f T}\right]^{1/2}$$

2. The combination of claim 1 further including a commutator responsive to the output of said integrator.

3. A telemetry system including a source of signal having a large random component, a power spectrum analyzer connected to said source for deriving the power spectrum of said signal, said power spectrum analyzer including a frequency scanning device including a selective output filter, said filter having a pass band sufficiently wide to pass appreciable random components of said signal said filter deriving output signals of variable durations, an averaging integrator connected in cascade with said filter, said averaging integrator including a plurality of RC low pass filters in cascade, the constants of said RC low pass filters being selected to provide a predetermined total delay such as to substantially retain the shape and timing of pulses generated by said scanning device in said filter while minimizing said random components of said signal, said integrator introducing an error, ε, less than 0.1 related to its band width, β, by $$\epsilon = 2\left[\frac{\beta}{\omega_f T}\right]^{1/2}$$

where $\omega_f$ is the pass band of said filter, and T is the period of the shortest time duration signal derived from said filter.

4. The system according to claim 3 wherein said averaging integrator comprises a first low pass filter having a predetermined delay time, a first amplifier in cascade with said first low pass filter, a second low pass filter having a predetermined delay time connected in cascade with said first amplifier, a second amplifier in cascade with said second low pass filter, and a third low pass filter in cascade with said second amplifier, said low pass filters being at least approximately the same.

5. The combination according to claim 4 wherein each low pass filter includes a series resistance and a shunt capacitor.

6. A power spectrum analyzer for analyzing the power spectrum of a function having a large noise component by means of repetitive rapid frequency scans, and eliminating the noise in the output of the system without introducing appreciable distortion of output pulses representing components of said power spectrum, comprising a first source of signals representing said function and said noise, a modulator, a second source of frequency scanning local oscillator signal, means connecting said first and second sources to said modulator in heterodyning relation, a relatively narrow band pass filter coupled to the output of said modulator, said filter having a band pass arranged to select a single product of said heterodyning and sufficiently narrow to permit continuous frequency sampling during said frequency scanning and to effect weighted averaging on the power spectrum of said function, a square law detector in cascade with said filter, and an averaging integrator in cascade with said square law detector, said averaging detector being a low pass filter, said averaging integrator including a plurality of cascaded low pass filters separated by amplifiers, wherein the total delay time of said filter is such as to substantially retain the shapes of the pulses presented to said averaging integrator during the frequency scanning operation of the system while minimizing the noise, said integrator introducing an error, ε, less than 0.1, related to its bandwidth, β, by $$\epsilon = 2\left[\frac{\beta}{\omega_f T}\right]^{1/2}$$

where $\omega_f$ is the band pass of said filter, in radians per second, and T is one half the time duration of the highest frequency of said single product, in seconds.

7. A power spectrum analyzer for analyzing the power spectrum of a function having a large noise component by means of repetitive rapid frequency scans, and eliminating the noise in the output of the system without introducing appreciable distortion of output pulses, comprising a first source of signals representing said function and said noise, a modulator, a second source of frequency scanning local oscillator signal, means connecting said first and second sources to said modulator in heterodyning relation, a relatively narrow band pass filter coupled to the output of said modulator, said filter having a band pass arranged to select approximately a single product of said heterodyning and sufficiently narrow to permit continuous sampling during said frequency scanning and to effect weighted averaging on the power spectrum of said function, a square law detector in cascade with said filter, and an averaging integrator in cascade with said square law detector, said averaging integrator being a low pass filter, wherein the total delay time of said filter is such as to substantially retain the shapes of the pulses presented to said averaging integrator during the frequency scanning operation of the system while minimizing the noise, said integrator introducing an error, ε, less than 0.1 related to its bandwidth, β, by $$\epsilon = 2\left[\frac{\beta}{\omega_f T}\right]^{1/2}$$

where $\omega_f$ is the band pass of said filter, in radians per second, and T is one half the time duration of the highest frequency of said single product, in seconds.

8. The combination according to claim 7 wherein the band width of said band pass filter is selected to minimize the mean square statistical error introduced into said spectrum analyzer as a function of pass band of said band pass filter, and wherein the scan rate of said scanning local oscillator is selected to be the highest scan rate capable of providing maximum response of said band pass filter.

9. An averaging integrator for periodic noisy pulses of duration T seconds and having only frequency components in a band width of $\omega_f$ radians per second, comprising a source of said pulses, a first low pass filter in cascade with said source, an amplifier in cascade with said first low pass filter, a second low pass filter in cascade with said amplifier, the delay times of said filters being selected sufficiently small to introduce a timing error for said pulses of less than 10 percent while retaining the shapes of said pulses, said filters introducing an error, ε, of less than 0.1 in the amplitude of said pulses without noise, and having a total bandwidth β in accordance with $$\epsilon = 2\left[\frac{\beta}{\omega_f T}\right]^{1/2}$$

10. An averaging integrator for periodic noisy pulses, comprising a source of said pulses, said filters introducing an error, ε, of less than 0.1 in the amplitude of said pulses without noise, and having a total bandwidth β in accordance with $$\epsilon = 2\left[\frac{\beta}{\omega_f T}\right]^{1/2}$$

a first low pass filter in cascade with said source of pulses, a first amplifier in cascade with said first low pass filter, a second low pass filter substantially duplicating said first low pass filter connected in cascade with said first amplifier, a second amplifier in cascade with said second low pass filter and a third low pass filter substantially duplicating said second low pass filter connected in cascade with said second amplifier, said filters together having a total delay time of less than 10 percent of the period of said pulses while retaining the shapes of said pulses.

11. The combination according to claim 10 wherein each of said low pass filters consists of a series resistance and a shunt capacity.

References Cited in the file of this patent

UNITED STATES PATENTS

| | | |
|---|---|---|
| 1,416,061 | Pupin and Armstrong | May 16, 1922 |
| 1,994,232 | Schuck | Mar. 12, 1935 |
| 2,111,710 | Van Loon | Mar. 22, 1938 |
| 2,244,259 | Plebanski | June 3, 1941 |
| 2,273,193 | Heising | Feb. 17, 1942 |

(Other references on following page)

UNITED STATES PATENTS

| | | |
|---|---|---|
| 2,408,858 | Keizer | Oct. 8, 1946 |
| 2,469,383 | Gibbs | May 10, 1949 |
| 2,476,445 | Lacy | July 19, 1949 |
| 2,522,369 | Guanella | Sept. 12, 1950 |
| 2,526,426 | Siezen | Oct. 17, 1950 |
| 2,546,918 | Branson | Mar. 27, 1951 |
| 2,605,358 | Neher | July 29, 1952 |
| 2,618,745 | Eitel | Nov. 18, 1952 |
| 2,629,772 | Ring | Feb. 24, 1953 |
| 2,661,419 | Tongue | Dec. 1, 1953 |
| 2,705,742 | Miller | Apr. 5, 1955 |
| 2,747,136 | Herzog | May 22, 1956 |
| 2,753,524 | Newsom | July 3, 1956 |
| 2,760,369 | Vanator | Aug. 28, 1956 |

OTHER REFERENCES

"A Multi Channel Noise Analyzer for 10-10,000 Cycles," article in The Review of Scientific Instruments, September, 1954, pages 899-901.

"Transistor Heterodyne Frequency Meter," article in C.Q., February 1957, pages 28, 29, and 117.

UNITED STATES PATENT OFFICE
CERTIFICATE OF CORRECTION

Patent No. 3,035,228            May 15, 1962

Alfred G. Ratz

It is hereby certified that error appears in the above numbered patent requiring correction and that the said Letters Patent should read as corrected below.

Column 6, lines 27 to 29, equation 21 should appear as shown below instead of as in the patent:

$$\frac{\sigma_v}{\bar{V}} = 2\left[\frac{\beta}{\omega_f T}\right]^{1/2}$$

Signed and sealed this 2nd day of October 1962.

(SEAL)
Attest:

ERNEST W. SWIDER
Attesting Officer

DAVID L. LADD
Commissioner of Patents